2,879,181
PROCESS FOR APPLYING STABLE WATER-REPELLENT COATINGS TO FIBROUS MATERIALS AND COATING COMPOSITION THEREFOR

Rudolf Aenishaenslin and Arthur Maeder, Basel, Switzerland, assignors to Ciba Limited, Basel, Switzerland, a Swiss firm No Drawing. Application January 6, 1956
Serial No. 557,657

Claims priority, application Switzerland January 20, 1955

15 Claims. (Cl. 117—161)

This invention is based on the observation that stable water-repellent coatings can be applied to fibrous materials by using for this purpose a coating preparation which comprises (a) A solution in an organic solvent, advantageously one which is at most of limited miscibility with water, of a flexible polymer obtained by the co-polymerization of at least one alkyl ester of an acid of the formula

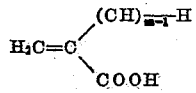

wherein $m$ represents a whole number of at the most 2 with at least one vinyl ester of a fatty acid of low molecular weight;

(b) An alkyl ether soluble in organic solvents of a formaldehyde condensation product of a nitrogenous compound of the formula

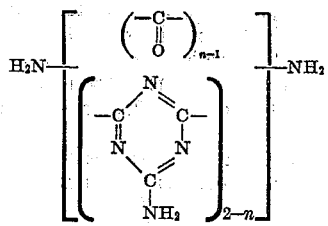

in which $n$ represents a whole number of at the most 2, and (c) A waxy water-repellent substance, and hardening the coating on the fiber at a raised temperature.

The fibrous materials to be coated by the process of this invention may, for example, be fabrics of natural or regenerated cellulose such as cotton, linen, staple fibers of artificial silk or regenerated cellulose, or fibers of acetyl-cellulose, and more especially fabrics of so-called fully synthetic fibers. Among the latter fibers there may be mentioned, for example, polyester fibers such as "Dacron" or "Terylene," polyacrylonitrile fibers such as "Orlon," polyvinyl chloride fibers such as "Thermovyl" and especially polyamide fibers such as "Perlon" or nylon. In general there are especially advantageous thin densely woven fabrics.

The solutions specified under (a) advantageously contain polymers of the specified type, which are obtained by the copolymerization of at least one alkyl ester of acrylic acid or of methacrylic acid, viz and acid of the formula

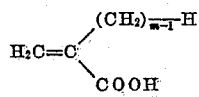

wherein $m$ represents a whole number of at the most 2, with at least one vinyl ester of a fatty acid of low molecular weight, for example vinyl acetate, vinyl propionate or vinyl butyrate, or valeric acid vinyl ester, the polymerization being advantageously carried out in a solvent of the kind required in the coating preparation so that such solvent is already present in the polymer and need not be added subsequently. By suitably selecting the starting materials and the conditions of polymerization flexible polymers or polymer solutions suitable for the present purpose can easily be obtained.

There are especially suitable, for example, copolymers of an acrylic acid alkyl ester, of which the alcohol radical contains a plurality of, for instance 3–6 carbon atoms, such as acrylic acid butyl ester, with acetic acid vinyl ester. The relative proportions of the polymerization components, for example, the relative proportions of acrylic acid butyl ester and acetic acid vinyl ester, may be within the range of 1:9 to 9:1. Good results are obtained when the proportions of the two polymerization components are the same or do not differ substantially from one another.

As solvents there come into consideration, for example, alcohols of low molecular weight, such as ethanol, n-propanol or isopropanol. There are preferably used, however, solvents which are at most of limited miscibility with water, for example, monocyclic hydrocarbons of the benzene series such as benzene, methyl-benzene or dimethyl-benzenes. Especially useful are aliphatic esters of fatty acids of low molecular weight, of which the alcohol radical contains up to 5 carbon atoms, such as acetic acid methyl ester, acetic acid propyl ester and especially acetic acid ethyl ester. These esters are very suitable both as solvents for the copolymerization and as solvents for the preparations to be used for coating in the present process, so that the process can be carried out in a very simple manner. The proportion of the solvent in relation to the polymer may vary within wide limits. As a rule there should be used a quantity of the solvent at least sufficient to dissolve the polymer completely therein and not to render the solution so highly viscous as to make the solution difficult to use. There is generally no useful purpose served by using a high dilution, for example, of substantially more than 1:10, because this only leads to disadvantages such as a high consumption of solvent and a sparse coating. In most cases it is of advantage to use the polymer and the solvent in proportions of the same order of magnitude. Thus, for example, the proportion of the solvent may amount to about double the proportion of the polymer.

The alkyl ethers of the nitrogenous compounds as defined above viz. the alkyl ethers of urea, or melamine-formaldehyde condensation products specified under (b), like the copolymers specified under (a) must be soluble in organic solvents, and among these solvents there may be mentioned more especially those which are of only limited miscibility with water. There are advantageously used alkyl ethers containing a plurality of, for example 3–6 carbon atoms in the alkyl radical, such as butyl ethers, which are advantageously dissolved in an alcohol slightly miscible with water, for example, n-butanol. These ethers can be obtained by etherifying methylol-urea or methylol-melamines with the appropriate alcohols.

Among the waxy water-repellent substances, which are present in the coating preparations in addition to the materials specified under (a) and (b), there are to be understood natural or synethetic waxes, that is to say, esters of monobasic acids of high molecular weight containing the radical of a monohydric or dihydric alcohol of high molecular weight, and also substances which are not waxes in the narrow sense, but which possess more especially the physical properties (melting point, solubility, hardness) of waxes, and especially mixtures of solid hydrocarbons. As examples of such water-repellent wax-like substances there may be mentioned vegetable waxes, such as carnauba wax, japan wax and palm wax, insect waxes such as beeswax, petroleum waxes such as paraffin wax, synthetic waxes such as acro wax and armor wax, synthetic paraffins and opal wax. In general paraffin waxes are especially advantageous.

The coating preparations, which contain the materials specified under (a), (b) and (c), may also contain further substances, for example, filling materials or pigments such as talc, kaolin, carbon black, titanium dioxide, metal powders (so-called bronzes), and, if desired, also softening agents for the fibrous materials to be coated.

It is sufficient to use the alkyl ethers of methylolmelamines or of methylol-urea specified under (b) and the wax-like substances in quite small proportions, for example, within the range of 0.5 to about 5.0 percent calculated on the weight of the solution of the copolymer. It is of advantage to dissolve the wax-like substance in one of the solvents mentioned above before adding such substance to the coating preparation.

The new coating preparations of this invention can be applied to the fabrics by methods in themselves known, for example, by immersing the fabric in the coating preparation followed by squeezing of the fabric until it retains the desired amount of the coating preparation, or advantageously by means of a spreading machine, advantageously one having a doctor device, the coating being applied to one or both sides of the fabric. If desired, several coatings may be applied. In this case the material is dried between the several coating operations at room temperature or at a raised temperature, for example, at 80–100° C.

In order to harden the coatings the coated material is advantageously heated at a raised temperature, for example, above 100° C. In most cases good results are obtained at temperatures of 120–130° C. and with hardening periods of 5–15 minutes. Fabrics so treated may, if desired, be smoothed, for example, by calendering under high pressure.

The coatings produced by the present process with the preparations specified above are distinguished by their flexibility even at low temperatures and by their very good adhesion. In contradistinction to coatings produced with the compositions specified under (a) alone or in admixture with paraffin wax, the new coatings produced by the present process are fast to washing and do not become sticky and are not removed from the fabric by the customary washing operations, for example, in warm water containing soap and sodium carbonate. The coatings also generally withstand other influences to which they are likely to be subjected during use, for example, the influence of sunlight, heat, moisture and micro-organisms.

The following examples illustrate the invention, the parts and percentages being by weight.

*Example 1*

The following ingredients are mixed together:

(a) 100 parts of a copolymer of 1 part of vinyl acetate and 1 part of n-butyl acrylate in 2 to 2.5 parts of ethyl acetate, which contains a trace of benzoyl peroxide, (b) 1–2 parts of a highly concentrated solution in butanol of a melamine-formaldehyde condensation product etherified with butanol, and (c) 1–2 parts of hard paraffin wax dissolved in 40–50 parts of methyl benzene.

There may be added to the spreadable composition containing the ingredients (a), (b) and (c) a filling material or pigment, such as talc, kaolin, carbon black or titanium dioxide. A fabric of polyamide fibers (nylon) is coated with the resulting composition on one or both sides in a spreading machine, advantageously one having a doctor device. If a pore-free coating is desired, and a single coating is not sufficient for this purpose, several coatings may be applied and the fabric dried between the coating operations at room temperature or at a raised temperature, for example, at 80–100° C. In order to produce a coating which is resistant to washing and swelling and is of good adhesion, the material is subjected to a hardening treatment at 120–130° C. for about 5–10 minutes. Finally, the fabric is polished by being calendered under high pressure.

The fabric so treated (so-called oiled silk) withstands washing with soap at 50° C. without the coating becoming sticky or being dissolved from the fabric.

Instead of a fabric of polyamide fibers, a cotton fabric or a fabric of polyacrylonitrile fibers ("Orlon") or polyester fibers ("Dacron," "Terylene") or cellulose acetate silk may be treated in the same manner.

Instead of the solution specified under (b) above, there may be used a highly concentrated solution in butanol of a urea-formaldehyde condensation product etherified with butanol.

For dissolving the copolymer there may be used benzene or methyl-benzene instead of ethyl acetate.

For dissolving the paraffin wax there may be used, instead of methyl-benzene, benzene, monochlorobenzene, acetone, butyl acetate or ethyl acetate. Furthermore the paraffin wax can be replaced by beeswax or carnauba wax.

*Example 2*

A spreadable composition is prepared by mixing—

(a) 100 parts of one of the solutions A or B described below containing 60% of a copolymer from methacrylic acid-n-butyl ester and viny ester in benzene, (b) 2 parts of a highly concentrated solution in butanol of a melamine-formaldehyde condensation product etherified with butanol, and (c) 2 parts of hard paraffin wax dissolved in 40–50 parts of methyl benzene.

A fabric of polyamide fibers is coated with this spreadable composition twice on the same side in a spreading machine so that the coating amounts to about 50 to 60 grams per square metre. After drying at 70–80° C. the material is subjected to hardening for 10 minutes at 120 to 125° C.

The fabric so treated withstands washing with soap at 50° C. without the coating becoming sticky or coming off the fabric.

The above copolymers are prepared as follows:

(A) By copolymerization of 60 parts of methacrylic acid-n-butyl ester and 40 parts of butyric acid vinyl ester in a benzene solution at a raised temperature and in the presence of an organic peroxide according to known methods.

(B) Preparation as described under A, but from 50 parts of methacrylic acid-n-butyl ester and 50 parts of propionic acid vinyl ester.

What is claimed is:

1. Process for applying a stable water-repellent coating to fibrous materials, which comprises applying to said materials a substantially anhydrous composition which contains (a) a solution in an organic solvent which is of at most limited miscibility with water of a flexible polymer obtained by the copolymerization of at least one alkyl ester of the formula

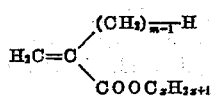

wherein $m$ represents a whole number of at the most 2 and $x$ is a whole number of at least 3 and at the most 6, with at least one ester of the formula

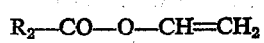

wherein $R_2$ represents an alkyl radical containing at the most 4 carbon atoms, (b) an alkyl ether soluble in organic solvents of a formaldehyde condensation product of a nitrogenous compound of the formula

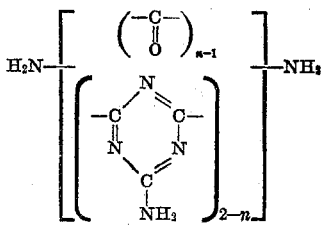

in which $n$ represents a whole number of at the most 2, and (c) a waxy water-repellent substance, said substantially anhydrous composition containing predominantly solution (a) and only minor amounts of components (b) and (c), and hardening the coating on the fibrous material at a raised temperature.

2. Process for applying a stable water-repellent coating to fibrous materials, which comprises applying to said materials a substantially anhydrous composition which contains (a) a solution in an organic solvent which is of at most limited miscibility with water of a flexible polymer obtained by the copolymerization of at least one alkyl ester of the formula

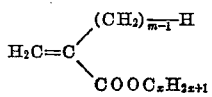

wherein $m$ represents a whole number of at the most 2 and $x$ is a whole number of at least 3 and at the most 6, with at least one ester of the formula

wherein $R_2$ represents an alkyl radical containing at the most 4 carbon atoms, (b) an alkyl ether soluble in organic solvents of at most limited solubility with water of a formaldehyde condensation product of a nitrogenous compound of the formula

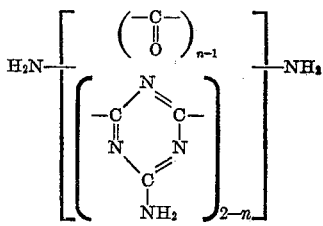

in which $n$ represents a whole number of at the most 2 and the alkyl radicals of which ether contain 3 to 6 carbon atoms each, and (c) a water-repellent wax, said substantially anhydrous composition containing predominantly solution (a) and only minor amounts of components (b) and (c), and hardening the coating on the fibrous material at a raised temperature.

3. Process for applying a stable water-repellent coating to fibrous materials, which comprises applying to said materials a substantially anhydrous composition which contains (a) a solution in a monocyclic hydrocarbon of the benzene series of a flexible polymer obtained by the copolymerization of at least one alkyl ester of the formula

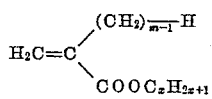

wherein $m$ represents a whole number of at the most 2 and $x$ is a whole number of at least 3 and at the most 6, with at least one ester of the formula

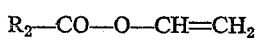

wherein $R_2$ represents an alkyl radical containing at the most 4 carbon atoms, (b) an alkyl ether soluble in organic solvents of at most limited solubility with water of a formaldehyde condensation product of a nitrogenous compound of the formula

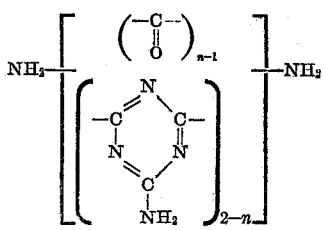

in which $n$ represents a whole number of at the most 2 and the alkyl radicals of which ether contain 3 to 6 carbon atoms each, and (c) a water-repellent wax, said substantially anhydrous composition containing predominantly solution (a) and only minor amounts of components (b) and (c), and hardening the coating on the fibrous material at a raised temperature.

4. Process for applying a stable water-repellent coating to fibrous materials, which comprises applying to said materials a substantially anhydrous composition which contains (a) a solution in an alkyl ester of a fatty acid of low molecular weight of which the alcohol radical contains at the most 5 carbon atoms of a flexible polymer obtained by the copolymerization of at least one alkyl ester of the formula

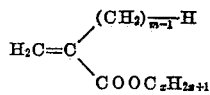

wherein $m$ represents a whole number of at the most 2 and $x$ is a whole number of at least 3 and at the most 6, with at least one ester of the formula

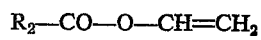

wherein $R_2$ represents an alkyl radical containing at the most 4 carbon atoms, (b) an alkyl ether soluble in organic solvents of at most limited solubility with water of a formaldehyde condensation product of a nitrogenous compound of the formula

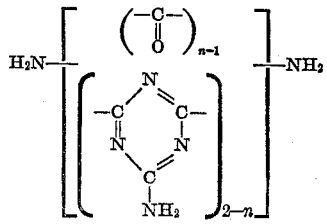

in which $n$ represents a whole number of at the most 2 and the alkyl radicals of which ether contain 3 to 6 carbon atoms each, and (c) a water-repellent wax, said substantially anhydrous composition containing predominantly solution (a) and only minor amounts of components (b) and (c), and hardening the coating on the fibrous material at a raised temperature.

5. Process for applying a stable water-repellent coating to fibrous materials, which comprises applying to said materials a substantially anhydrous composition which contains (a) a solution in an alkyl ester of low molecular weight of which the alcohol radical contains at the most 5 carbon atoms of a flexible polymer obtained by the copolymerization of an acrylic acid alkyl ester, the alkyl radical of which corresponds to the formula $C_xH_{2x+1}$ wherein $x$ is a whole number of at least 3 and at the most 6, with a vinyl ester of a fatty acid which contains at the most 5 carbon atoms, (b) an alkyl ether soluble in organic solvents of at most limited solubility with water of a melamine formaldehyde condensation product the alkyl radicals of which ether contain 3 to 6 carbon atoms each, and (c) paraffin wax, said substantially anhydrous composition containing predominantly solution (a) and only minor amounts of components (b)

and (c), and hardening the coating on the fibrous material at a temperature between 120 and 130° C.

6. Process for applying a stable water-repellent coating to fibrous materials, which comprises applying to said materials a substantially anhydrous composition which contains (a) a solution in an alkyl ester of low molecular weight of which the alcohol radical contains at the most 5 carbon atoms of a flexible polymer obtained by the copolymerization of an acrylic acid alkyl ester, the alkyl radical of which corresponds to the formula $C_xH_{2x+1}$ wherein $x$ is a whole number of at least 3 and at the most 6, with a vinyl ester of a fatty acid which contains at the most 5 carbon atoms, (b) an alkyl ether soluble in organic solvents of at most limited solubility with water of a urea formaldehyde condensation product the alkyl radicals of which ether contain 3 to 6 carbon atoms each, and (c) paraffin wax, said substantially anhydrous composition containing predominantly solution (a) and only minor amounts of components (b) and (c), and hardening the coating on the fibrous material at a temperature between 120 and 130° C.

7. Process for applying a stable water-repellent coating to fibrous materials, which comprises applying to said materials a substantially anhydrous composition which contains (a) a solution in a monocyclic hydrocarbon of the benzene series of a flexible polymer obtained by the copolymerization of an acrylic acid alkyl ester, the alkyl radical of which corresponds to the formula $C_xH_{2x+1}$ wherein $x$ is a whole number of at least 3 and at the most 6, with a vinyl ester of a fatty acid which contains at the most 5 carbon atoms, (b) an alkyl ether soluble in organic solvents of at most limited solubility with water of a melamine formaldehyde condensation product the alkyl radicals of which ether contain 3 to 6 carbon atoms each, and (c) paraffin wax, said substantially anhydrous composition containing predominantly solution (a) and only minor amounts of components (b) and (c), and hardening the coating on the fibrous material at a temperature between 120 and 130° C.

8. Process for applying a stable water-repellent coating to fibrous materials, which comprises applying to said materials a substantially anhydrous composition which contains (a) a solution in a monocyclic hydrocarbon of the benzene series of a flexible polymer obtained by the copolymerization of an acrylic acid alkyl ester, the alkyl radical of which corresponds to the formula $C_xH_{2x+1}$ wherein $x$ is a whole number of at least 3 and at the most 6, with a vinyl ester of a fatty acid which contains at the most 5 carbon atoms, (b) an alkyl ether soluble in organic solvents of at most limited solubility with water of an urea formaldehyde and condensation product the alkyl radicals of which ether contain 3 to 6 carbon atoms each, and (c) paraffin wax, said substantially anhydrous composition containing predominantly solution (a) and only minor amounts of components (b) and (c), and hardening the coating on the fibrous material at a temperature between 120 and 130° C.

9. Process for applying a stable water-repellent coating to fibrous materials, which comprises applying to said materials a substantially anhydrous composition which contains (a) a solution in a monocyclic hydrocarbon of the benzene series of a flexible polymer obtained by the copolymerization of a methacrylic alkyl ester the alkyl radical of which corresponds to the formula $C_xH_{2x+1}$ wherein $x$ is a whole number of at least 3 and at the most 6, with a vinyl ester of a fatty acid which contains at the most 5 carbon atoms, (b) an alkyl ether soluble in organic solvents of at most limited solubility with water of a melamine formaldehyde condensation product the alkyl radicals of which contain 3 to 6 carbon atoms each, and (c) paraffin wax, said substantially anhydrous composition containing predominantly solution (a) and only minor amounts of components (b) and (c), and hardening the coating on the fibrous material at a temperature between 120 and 130° C.

10. Process for applying a stable water-repellent coating to fibrous materials which comprises applying to a fabric of synthetic textile fibers a substantially anhydrous composition which contains (a) a solution in ethyl acetate of a copolymer of about equal quantities of n-butyl acrylate and vinyl acetate, (b) a solution in butanol of a melamine formaldehyde condensation product etherified with butanol, (c) a solution of hard paraffin wax in methyl benzene, said substantially anhydrous composition containing predominantly solution (a) and only minor amounts of components (b) and (c), and hardening the coating on the fibrous material at a temperature between 120 and 130° C.

11. Process for applying a stable water-repellent coating to fibrous materials which comprises applying to a fabric of synthetic textile fibers a substantially anhydrous composition which contains (a) a solution in ethyl acetate of a copolymer of about equal quantities of n-butyl acrylate and vinyl acetate, (b) a solution in butanol of an urea formaldehyde condensation product etherified with butanol, (c) a solution of hard paraffin wax in methyl benzene, said substantially anhydrous composition containing predominantly solution (a) and only minor amounts of components (b) and (c), and hardening the coating on the fibrous material at a temperature between 120 and 130° C.

12. Process for applying a stable water-repellent coating to fibrous materials which comprises applying to a fabric of synthetic textile fibers a substantially anhydrous composition which contains (a) a solution in benzene of a copolymer of about equal quantities of n-butyl acrylate and vinyl acetate, (b) a solution in butanol of a melamine formaldehyde condensation product etherified with butanol, (c) a solution of hard paraffin wax in methyl benzene, said substantially anhydrous composition containing predominantly solution (a) and only minor amounts of components (b) and (c), and hardening the coating on the fibrous material at a temperature between 120 and 130° C.

13. Process for applying a stable water-repellent coating to fibrous materials which comprises applying to a fabric of synthetic textile fibers a substantially anhydrous composition which contains (a) a solution in benzene of a copolymer of about equal quantities of n-butyl acrylate and vinyl acetate, (b) a solution in butanol of an urea formaldehyde condensation product etherified with butanol, (c) a solution of hard paraffin wax in methyl benzene, said substantially anhydrous composition containing predominantly solution (a) and only minor amounts of components (b) and (c), and hardening the coating on the fibrous material at a temperature between 120 and 130° C.

14. Process for applying a stable water-repellent coating to fibrous materials which comprises applying to a fabric of synthetic textile fibers a substantially anhydrous composition which contains (a) a solution in benzene of a copolymer of about equal quantities of n-butyl methacrylate and vinyl propionate, (b) a solution in butanol of a melamine formaldehyde condensation product etherified with butanol, (c) a solution of hard paraffin wax in methyl benzene, said substantially anhydrous composition containing predominantly solution (a) and only minor amounts of components (b) and (c), and hardening the coating on the fibrous material at a temperature between 120 and 130° C.

15. A substantially anhydrous composition suitable for coating fibrous material which composition contains (a) a solution in an organic solvent of a flexible polymer obtained by the copolymerization of at least one alkyl ester of the formula

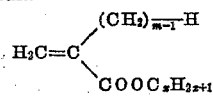

wherein $m$ represents a whole number of at the most 2 and $x$ is a whole number of at least 3 and at the most 6, with at least one vinyl ester of a fatty acid of low molecular weight, (b) an alkyl ether soluble in organic solvents of a formaldehyde condensation product of a nitrogenous compound of the formula

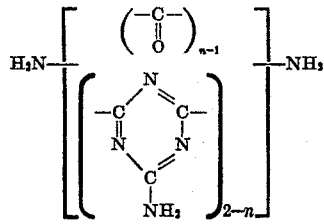

in which $n$ represents a whole number of at the most 2, and (c) a waxy water-repellent substance, said substantially anhydrous composition containing predominantly solution (a) and only minor amounts of components (b) and (c).

References Cited in the file of this patent

UNITED STATES PATENTS

| | | |
|---|---|---|
| 2,737,458 | Burnham | May 15, 1952 |
| 2,681,897 | Frazier et al. | June 22, 1954 |
| 2,719,832 | Craemer et al. | Oct. 4, 1955 |
| 2,727,015 | Auten et al. | Dec. 13, 1955 |
| 2,751,364 | Wetstone et al. | June 19, 1956 |

FOREIGN PATENTS

| | | |
|---|---|---|
| 654,955 | Great Britain | July 4, 1951 |